H.D. Forbes.
Bilge Water Discharging.
No. 76. A.I. Patented Jun. 14, 1845.
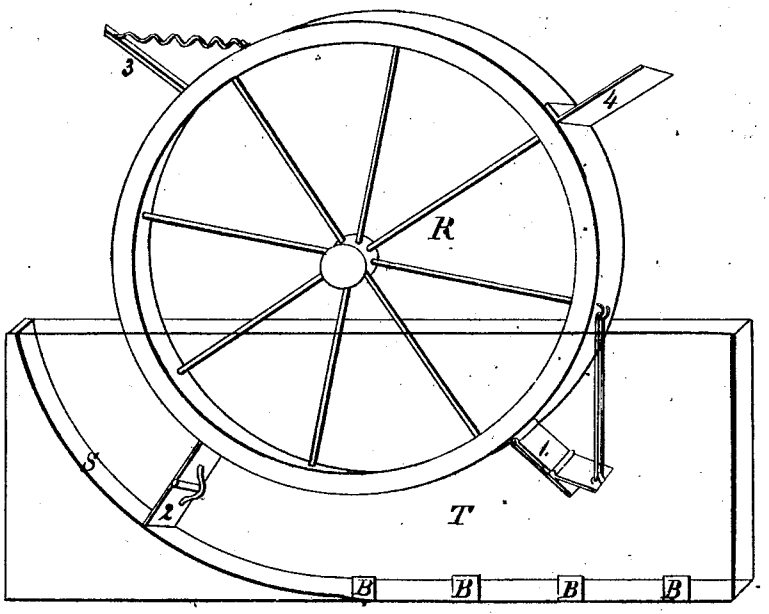
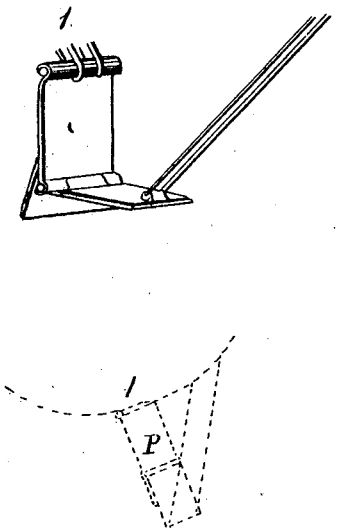
N. PETERS, PHOTO-LITHOGRAPHER, WASHINGTON, D. C.